(12) United States Patent
Mihic

(10) Patent No.: US 8,020,474 B2
(45) Date of Patent: Sep. 20, 2011

(54) VIBRATION-DAMPED TOOL HOLDER

(75) Inventor: Peter Mihic, Gävle (SE)

(73) Assignee: Microna AB, Gavle (SE)

( * ) Notice: Subject to any disclaimer, the term of this patent is extended or adjusted under 35 U.S.C. 154(b) by 1331 days.

(21) Appl. No.: 10/588,354

(22) PCT Filed: Feb. 2, 2005

(86) PCT No.: PCT/SE2005/000123
§ 371 (c)(1),
(2), (4) Date: Oct. 18, 2006

(87) PCT Pub. No.: WO2005/075134
PCT Pub. Date: Aug. 18, 2005

(65) Prior Publication Data
US 2008/0145162 A1 Jun. 19, 2008

(30) Foreign Application Priority Data
Feb. 3, 2004 (SE) .................................. 0400211

(51) Int. Cl.
*B23B 27/00* (2006.01)
*B23B 29/00* (2006.01)

(52) U.S. Cl. .............. 82/163; 82/158; 82/904; 409/141; 408/143

(58) Field of Classification Search .................... 82/158, 82/163, 173, 904; 409/141; 408/143; 267/137
See application file for complete search history.

(56) References Cited

U.S. PATENT DOCUMENTS

| | | | |
|---|---|---|---|
| 2,310,409 A | 2/1943 | Ellman | |
| 2,426,359 A | 8/1947 | Lankheet | |
| 2,535,398 A * | 12/1950 | Economous | 408/211 |
| 2,563,559 A | 8/1951 | Ingolf | 83/835 |
| 2,606,366 A * | 8/1952 | Stevens | 433/166 |
| 2,699,696 A | 1/1955 | Hahn | 408/143 |
| 2,842,014 A | 7/1958 | Miller | 408/144 |
| 2,928,757 A | 3/1960 | Lee et al. | |
| 3,292,237 A | 12/1966 | Fisher | |

(Continued)

FOREIGN PATENT DOCUMENTS
DE 19948891 4/2001

(Continued)

OTHER PUBLICATIONS

Database WPI, Week 197807, Derwent Publications Ltd., London, GB; Class P54, AN 1978-B4449A (Lengd Mechanic Inst), Jun. 30, 1977 abstract.

(Continued)

*Primary Examiner* — Boyer D Ashley
*Assistant Examiner* — Sara Addisu
(74) *Attorney, Agent, or Firm* — Ware, Fressola, Van Der Sluys & Adolphson LLP

(57) ABSTRACT

A tool holder (1) has a shaft (2) intended to be arranged in a tool holder in a manufacturing machine, a head (3) on which a cutter is intended to be arranged and a viscoelastic materials (4) arranged so that the cutter is in contact with the manufacturing machine solely via the viscoelastic material (4), in which at least those parts on the surface (5) of the shaft (2) that are intended to be in contact with the manufacturing machine are provided with the viscoelastic material (4). The viscoelastic material (4) is attached on a bearer material that is attached to the surface (5) of the shaft (2).

13 Claims, 2 Drawing Sheets

U.S. PATENT DOCUMENTS

| | | | |
|---|---|---|---|
| 3,463,048 A | | 8/1969 | Owsen |
| 3,662,855 A | * | 5/1972 | Adams et al. ............... 181/207 |
| 3,663,116 A | | 5/1972 | Muller et al. ............... 408/143 |
| 3,774,730 A | | 11/1973 | Maddux ..................... 188/379 |
| 3,774,731 A | | 11/1973 | Zerb |
| 3,783,970 A | | 1/1974 | Danielson |
| 3,842,942 A | | 10/1974 | Jensen et al. |
| 3,848,931 A | * | 11/1974 | Swisher ..................... 299/100 |
| 4,068,742 A | | 1/1978 | Resare ..................... 188/322.5 |
| 4,353,433 A | | 10/1982 | Mohrenstein-Ertel et al. |
| 4,410,825 A | * | 10/1983 | Lobastov ..................... 310/327 |
| 4,516,658 A | | 5/1985 | Scarton et al. ............... 181/208 |
| 4,553,884 A | | 11/1985 | Fitzgerald et al. ........... 408/143 |
| 4,616,738 A | | 10/1986 | Shurtliff |
| 4,706,788 A | | 11/1987 | Inman et al. ................ 188/378 |
| 4,759,428 A | * | 7/1988 | Seshimo ..................... 188/312 |
| 4,871,286 A | | 10/1989 | Hunt |
| 4,887,528 A | | 12/1989 | Ruge et al. |
| 4,979,821 A | | 12/1990 | Schutt et al. |
| 4,998,851 A | | 3/1991 | Hunt |
| 5,033,340 A | | 7/1991 | Siefring |
| 5,259,709 A | | 11/1993 | Hunt |
| 5,413,318 A | * | 5/1995 | Andreassen ................ 267/140 |
| 5,419,371 A | * | 5/1995 | Berchem ..................... 138/42 |
| 5,784,273 A | * | 7/1998 | Madhavan ..................... 700/71 |
| 5,869,798 A | | 2/1999 | Ryu et al. |
| 6,076,999 A | | 6/2000 | Hedberg et al. |
| 6,345,942 B1 | | 2/2002 | Cook ......................... 409/131 |
| 6,925,915 B1 | | 8/2005 | Claesson et al. ............. 82/133 |
| 6,929,431 B2 | | 8/2005 | Bergholt et al. ............. 408/143 |
| 2007/0228879 A1 | | 10/2007 | Imai et al. ................. 310/323.01 |
| 2008/0019782 A1 | | 1/2008 | Imai et al. ..................... 407/11 |

FOREIGN PATENT DOCUMENTS

| | | |
|---|---|---|
| EP | 0 663 542 A1 | 7/1995 |
| EP | 1 266 710 A1 | 12/2002 |
| JP | 2279329 | 7/1997 |
| JP | 2002233911 | 8/2002 |
| JP | 2003-62758 | 3/2003 |
| JP | 2004202649 | 7/2004 |
| RU | 2028876 C1 | 12/1995 |
| SU | 536890 | 12/1976 |
| SU | 559779 | 6/1977 |
| SU | 810387 | 3/1981 |
| WO | 96/21113 | 11/1996 |
| WO | 0076702 | 12/2000 |
| WO | 02/45892 | 6/2002 |
| WO | 02/45892 A1 | 6/2002 |
| WO | 2007/114034 A1 | 10/2007 |

OTHER PUBLICATIONS

Database WPI, Week 197725, Derwent Publications Ltd., London, G8; Class P54, AN 1977-F2088Y (Ieng Mech Eng Coli), Dec. 26, 1976 abstract.

Database WPI, Week 200367, Derwent Publications Ltd., London, G8; Class ASS, AN 2003-700165 (Enomoto KK), Mar. 5, 2003 abstract.

Database WPI, Week 199735, Derwent Publications Ltd., London, GB; Class M13, AN 1991-003001 (Tanaka Kikinzoku Kogyo KK), Jul. 30, 1997 abstract.

Database WPI, Week. 198149, Derwent Publications Ltd., London, G8; Class P54, AN 1981-M6314D (Irkut Poly), Mar. 10, 1981 abstract; figure 1.

Patent Abstracts of Japan, vol. 2002, No. 12, Dec. 12, 2002.

Patent Abstracts of Japan, vol. 2003, No. 12, Dec. 5, 2003.

Fastov, Y.K. et al, "Alloys with high damping properties", Moscow, Metallugry, 1973, pp. 30, 31, totally—3 pages.

Polytechnic dictionary, Second edition, Moscow, Soviet encyclopedia, 1980, p. 106, 613, totally—3 pages.

"Electroplating coatings in machinery", Reference book, Moscow, "Machinery", vol. 1, pp. 2, 3, totally—3 pages.

"Electroplating coatings in machinery", Reference book, Moscow, "Machinery", vol. 2, p. 185, totally—2 pages.

* cited by examiner

VIBRATION-DAMPED TOOL HOLDER

TECHNICAL AREA

The present invention relates to a vibration-damped tool holder.

BACKGROUND TO THE INVENTION

Tool holders in manufacturing machines have a tendency to vibrate and give rise to noise when in use. Such vibration disturbs the work process by having a negative effect on the accuracy of the result. The vibrations also give rise to a troublesome disturbing noise that worsens the environment around the manufacturing machine.

A perfect manufacturing machine does not give rise to any vibrations, and all energy is passed to the process that is to be carried out. In practice, vibrations always arise when the various parts of the machine work against each other. As the machine becomes more and more worn, changes in its dynamic properties take place. This means that new types of vibration can arise during different periods of the lifetime of the machine. The vibrations can lead to poor surface finish of the work piece, further wear on the machine and on tools, with, in the worst case, irreparable damage as a consequence.

During the processing of metal materials, problems also arise that are caused by the high level of noise caused by vibrations from the processing and the noise of the machine. Tools that have been used up until the present have not had built-in or subsequently added damping arrangements of such a type that sufficient damping of sound and vibration has been possible. It is important to be able to remove major parts of the vibration noise within the frequency interval that is uncomfortable for the human ear. It is desirable that the level is reduced to a level under 80 dB.

The arrangement of a vibration-damping material in a longitudinal track on a tool holder is previously known through U.S. Pat. No. 2,426,359. The aim is to completely damp the vibrations, or at least to reduce them significantly.

A tool holder is previously known through WO 02/45892 A1 (FIG. 14) with a damping element. The distance between the damping element and the tool body is such that a relative motion between the tool body and the damping element is permitted during processing.

A tool holder for several tools is previously known through U.S. Pat. No. 5,033,340 A. An aperture is present in the connecting surface between each tool and the tool holder, and a "damping sandwich" construction is arranged in this aperture. This design consists of alternating layers of steel and viscoelastic material. It is considered that this design reduces noise.

Previous attempts to solve the problem of vibrations have thus contained complicated solutions with weights and fluids in cavities in the tool holder intended to oscillate with inverted phase relative to the undesired vibrations and in this way to cancel them out. Other solutions demonstrate material arranged on the surface of the tool holder intended in the same manner to oscillate with inverted phase for cancellation of the vibrations. These solutions in general involve troublesome dimensioning procedures and testing procedures before the correct material and properties are found, even if this is possible at all.

One aspect of the present invention is thus to achieve a tool holder with the conditions required to damp vibrations in a simpler manner.

BRIEF DESCRIPTION OF THE INVENTION

The present invention, therefore, demonstrates a shaft intended to be arranged in a tool holder in a manufacturing machine, a head on which a cutter is intended to be arranged and a viscoelastic material arranged such that the cutter is in contact with the manufacturing machine solely through the viscoelastic material.

The tool holder is, in this way, not in metal-to-metal contact with the manufacturing machine, and has thus the conditions required for damping vibrations, to a large extent.

In one embodiment of the tool holder according to the present invention the surface of the shaft, at least those parts of it that are intended to be in contact with the manufacturing machine, is provided with a viscoelastic material.

In a further embodiment of the tool holder according to the present invention the viscoelastic material surrounds the surface of the shaft.

In a further embodiment of the tool holder according to the present invention, the viscoelastic material is divided into a number of plates threaded onto the shaft and arranged next to each other.

In a further embodiment of the tool holder according to the present invention a metal tube is arranged externally coaxial with the viscoelastic material intended to absorb and even out the pressure during attachment.

In a further embodiment of the tool holder according to the present invention the viscoelastic material has ridges arranged in tracks in the surface of the shaft running along the longitudinal axis of the shaft.

In a further embodiment of the tool holder according to the present invention the viscoelastic material is glued onto the surface of the shaft.

In a further embodiment of the tool holder according to the present invention the plates are punched out.

In an alternative embodiment of the tool holder according to the present invention the shaft and the head are two separate parts united through a viscoelastic material.

In a further embodiment the viscoelastic material is attached at the shaft and at the head through gluing.

In a further embodiment the shaft is provided with a cavity.

In a further embodiment the cavity has been drilled out in the form of a cylinder.

It has become apparent that reductions of 500 to 600% can be obtained with a tool holder according to the present invention, compared to a conventional tool holder.

DESCRIPTION OF EMBODIMENTS

Figure 1:
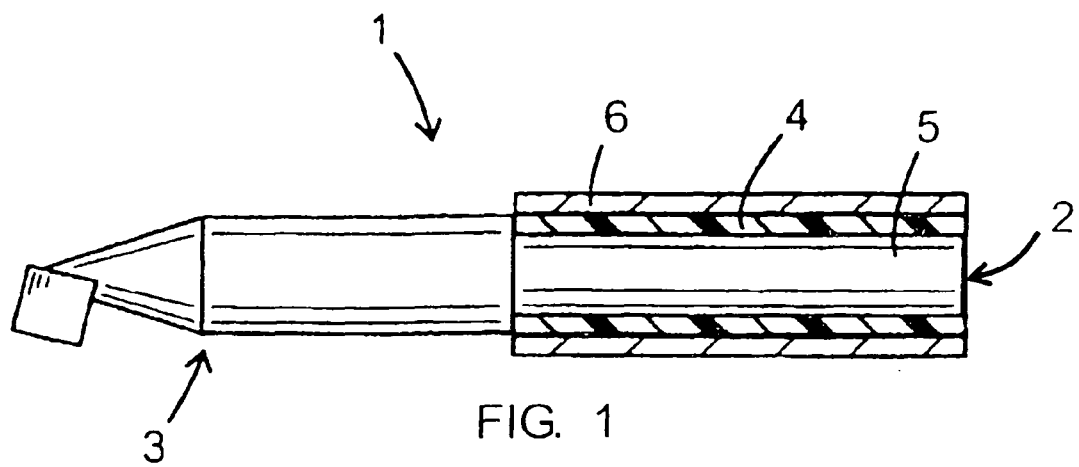
FIG. 1 shows a tool holder according to a first embodiment of the present invention.

With reference to FIG. 1, a first embodiment of the invention is constituted by a tool holder 1, consisting of a shaft 2 and a head 3. A cutter is intended to be arranged on the head 3. The shaft 2 of the tool holder 1 is provided with a viscoelastic material 4 around its surface 5. The viscoelastic material 4 in this embodiment is in the form of a sheet or tape, with a thickness of a few tenths of a millimeter, wound around a bearer material, such as an aluminium plate, wound around the surface 5 and attached to this surface with the aid of glue or similar. A non-compulsory iron tube 6 is arranged around the viscoelastic material 4 intended to distribute more evenly the mounting forces when the tool holder 1 is attached to a manufacturing machine. The radius of the shaft 2 can be less than that of the head 3, and the bearer material and the sheet together with the thickness of the steel tube 6 may be equivalent to this difference, which thus ensures that the outer surface of the steel tube is in contact with the surface of the head 3. It is also possible to attach these onto the shaft of a tool holder of conventional design. Furthermore, the viscoelastic material may surround as large a part as possible of the tool holder, something that has proven to give further advantageous damping effects.

Figure 2:
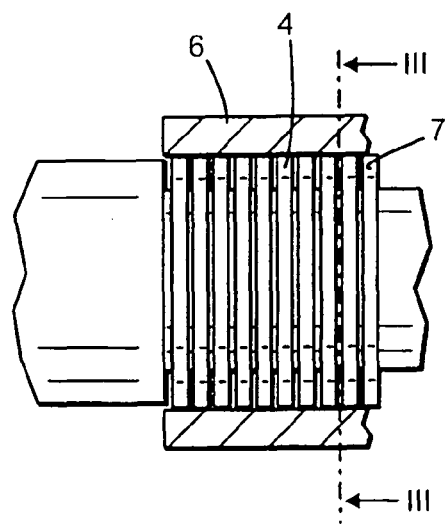
FIG. 2 shows a tool holder according to a second embodiment of the present invention.

With reference now to FIG. 2, a second embodiment of the invention is constituted by a tool holder 1. The shaft 2 of the tool holder 1 is provided with a viscoelastic material 4 on its surface 5. The viscoelastic material 4 in this embodiment is designed as a number of plates 7 threaded onto the shaft 2 and arranged next to each other. The plates 7 are attached onto a bearer material, such as an aluminium plate, wound around the surface 5 and attached to this surface with the aid of a glue or similar. A steel tube 6 may or may not be arranged around the plates 7, intended to distribute more evenly the mounting forces when the tool holder 1 is mounted in a manufacturing machine. The radius of the shaft 2 is, in the same way as in the embodiment according to FIG. 1, less than the radius of the head 3, such that the outer surface of the steel tube 6 makes contact with the surface of the head 3.

Figure 3:
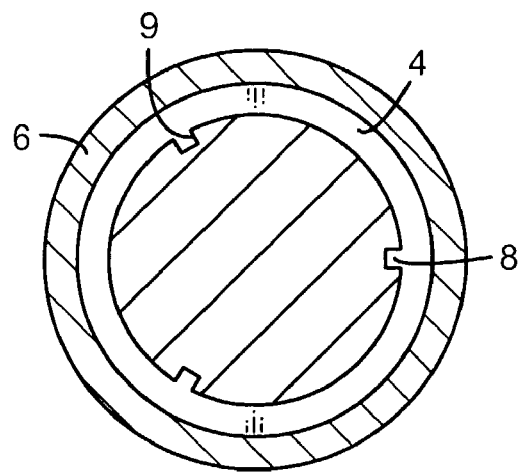
FIG. 3 shows a cross-section through a shaft of a modification of the tool holder according to FIGS. 1 and 2 according to the present invention.

With reference to FIG. 3, a modification is displayed that is suitable for both the embodiments according to FIG. 1 and FIG. 2. The viscoelastic material 4 is in this case provided with longitudinal spline-formed ridges 8 that have equivalent longitudinal tracks 9 in the surface 5 of the shaft. The ridges 8 are glued into the tracks 9. There may be one or several ridges. The modification in FIG. 3 shows 3 ridges, which can be regarded as a suitable number. The ridges 8 are intended to prevent the viscoelastic material/the plates 4/7 rotating around the shaft 2 during operation.

Figure 4:
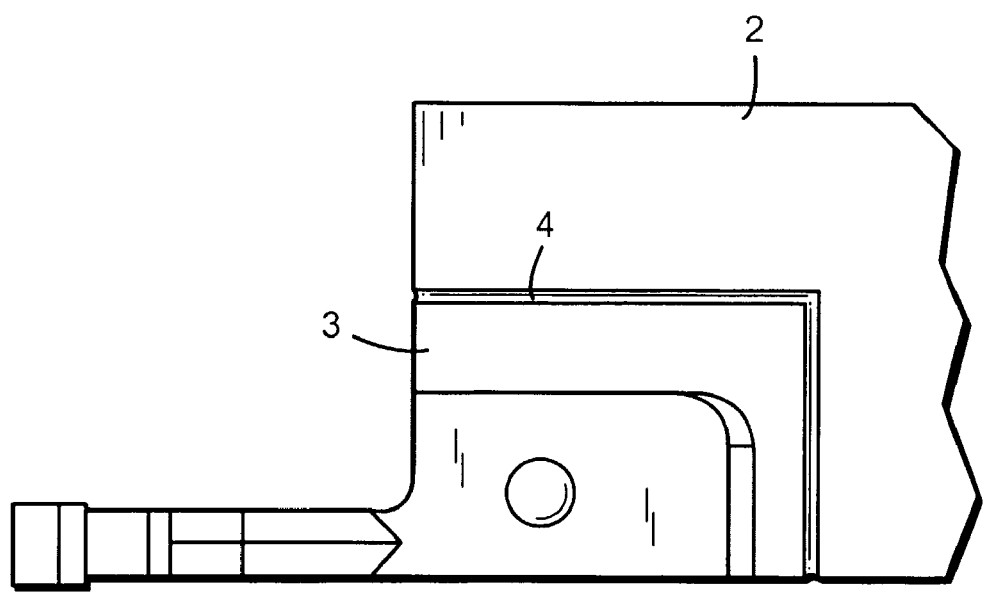
FIG. 4 shows a tool holder according to a third embodiment of the present invention.

With reference now to FIG. 4, a third embodiment of the invention is constituted by a tool holder 1. The tool holder is physically divided into two parts, a forward head 3 intended to accommodate a cutter, and a rear shaft 2 intended to be mounted into a manufacturing machine. The shaft 2 and the head 3 are separated from each other by a viscoelastic material 4. The viscoelastic material 4 is attached to each of the two parts 2, 3 by gluing. The viscoelastic material 4 may be arranged at any location on the tool holder between the attachment of the cutter into the front end of the tool holder and the region intended for mounting into the manufacturing machine. It is preferable that the viscoelastic material 4 is arranged at the front end in the manner that is shown in FIG. 4. In this embodiment, the viscoelastic material 4 may be in the form of a sheet or tape, with a thickness of a few tenths of a millimeter, and it may also be attached onto a bearer material, such as an aluminium plate, that is attached to one of the parts 2, 3 with the aid of glue or similar. The viscoelastic material is then attached to the other part 2, 3.

It has proven to be the case that the damping properties can be further improved if the shaft of the tool holder is provided with a cavity, preferably in the form of a drilled cylinder.

The vibrations can be cancelled by designing the viscoelastic material in a suitable manner.

The invention claimed is:

1. A tool holder comprising:
   a shaft intended to be arranged in a manufacturing machine;
   a head on which a cutter is intended to be arranged, the head being arranged on the shaft; and
   a viscoelastic material is divided into plates arranged on the shaft such that the cutter arranged on the head is isolated from the manufacturing machine via the viscoelastic material, in which at least those parts on a surface of the shaft that are intended to be in contact directly or indirectly with the manufacturing machine are provided with the viscoelastic material, the viscoelastic material attached on a bearer material attached to the surface of the shaft.

2. The tool holder according to claim 1, wherein the viscoelastic material surrounds the surface of the shaft.

3. The tool holder according to claim 2, wherein a metal tube is arranged coaxially external to the viscoelastic material intended to absorb and even out the pressure during mounting and provide an indirect contact between the viscoelastic material and the manufacturing machine.

4. The tool holder according to claim 2, wherein the plates are arranged next to each other.

5. The tool holder according to claim 4, wherein a metal tube is arranged coaxially external to the viscoelastic material intended to absorb and even out the pressure during mounting and provide an indirect contact between the viscoelastic material and the manufacturing machine.

6. The tool holder according to claim 5, wherein the viscoelastic material has ridges arranged in tracks in the surface of the shaft running along its longitudinal axis.

7. The tool holder according to claim 4, wherein the plates are punched out.

8. The tool holder according to claim 1, wherein the shaft is provided with a cavity.

9. The tool holder according to claim 8, wherein the cavity is a drilled cylinder.

10. The tool holder according to claim 1, wherein a metal tube is arranged coaxially external to the viscoelastic material intended to absorb and even out the pressure during mounting and provide an indirect contact between the viscoelastic material and the manufacturing machine.

11. The tool holder according to claim 10, wherein the viscoelastic material has ridges arranged in tracks in the surface of the shaft running along its longitudinal axis.

12. The tool holder according to claim 1, wherein the viscoelastic material has ridges arranged in tracks in the surface of the shaft running along its longitudinal axis.

13. The tool holder according to claim 1, wherein the viscoelastic material is attached around the shaft.

\* \* \* \* \*

UNITED STATES PATENT AND TRADEMARK OFFICE
CERTIFICATE OF CORRECTION

| | |
|---|---|
| PATENT NO. | : 8,020,474 B2 |
| APPLICATION NO. | : 10/588354 |
| DATED | : September 20, 2011 |
| INVENTOR(S) | : Peter Mihic |

It is certified that error appears in the above-identified patent and that said Letters Patent is hereby corrected as shown below:

In column 4, line 28, "2" should be --1--.

Signed and Sealed this
Twenty-second Day of November, 2011

David J. Kappos
*Director of the United States Patent and Trademark Office*